United States Patent [19]

Schumann et al.

[11] Patent Number: 5,656,221
[45] Date of Patent: Aug. 12, 1997

[54] PROCESS FOR DIRECT PRODUCTION OF LOW ACETALDEHYDE PACKAGING MATERIAL

[75] Inventors: Heinz-Dieter Schumann, Maintal; Ulrich Thiele, Bruchkoebel, both of Germany

[73] Assignee: Zimmer Aktiengesellschaft, Germany

[21] Appl. No.: 518,203

[22] Filed: Aug. 23, 1995

[30] Foreign Application Priority Data

Feb. 1, 1995 [DE] Germany ............... 195 03 053.2

[51] Int. Cl.$^6$ ............... B29C 47/36; B29C 47/76
[52] U.S. Cl. ............... 264/85; 264/102; 264/211; 525/425; 528/274; 528/280; 528/286; 528/308.3; 528/308.8; 528/483
[58] Field of Search ............... 264/85, 102, 211; 525/425; 528/274, 280, 286, 308.3, 308.8, 483

[56] References Cited

U.S. PATENT DOCUMENTS

| | | | |
|---|---|---|---|
| 2,742,451 | 4/1956 | Heisenberg et al. | 528/308.4 |
| 2,865,892 | 12/1958 | Izard et al. | 528/481 |
| 3,480,587 | 11/1969 | Porter | 526/64 |
| 3,486,864 | 12/1969 | Van Der Schee et al. | 264/102 X |
| 3,499,873 | 3/1970 | Kuehne et al. | 528/308.3 |
| 3,499,874 | 3/1970 | Takahashi et al. | 528/315 |
| 3,617,225 | 11/1971 | Kuehne et al. | 422/134 |
| 4,020,049 | 4/1977 | Rinehart | 528/274 |
| 4,072,663 | 2/1978 | Pendlebury | 526/65 |
| 4,142,040 | 2/1979 | Jabarin et al. | 528/481 |
| 4,230,819 | 10/1980 | Hauenstein et al. | 528/483 |
| 4,238,593 | 12/1980 | Duh | 528/272 |
| 4,263,425 | 4/1981 | Rothe et al. | 528/308.1 |
| 4,837,115 | 6/1989 | Igarashi et al. | 428/36.92 |
| 5,055,273 | 10/1991 | Wilhelm et al. | 422/135 |
| 5,080,845 | 1/1992 | Herrmann et al. | 264/101 |
| 5,258,235 | 11/1993 | Mehta et al. | 428/530 |
| 5,266,413 | 11/1993 | Mills et al. | 428/480 |

*Primary Examiner*—Leo B. Tentoni
*Attorney, Agent, or Firm*—McDonnell Boehnen Hulbert & Berghoff

[57] ABSTRACT

Process for direct production of shaped packaging material made of thermoplastic polyesters with no effect on the taste of foods packaged in them, where the diol component of the polyester consists of at least 70 wt % ethylene glycol, and the polyester is produced in the presence of the usual catalysts plus additional cobalt or cobalt and manganese compounds and phosphorus compounds. An inert gas is introduced into the polyester melt and distributed uniformly in the melt immediately after its discharge from the polycondensation reactor, 0.05 to 1.0 wt % of an amide compound with a low volatility is added to the polyester melt directly next to the gas inlet. Finally, the polyester melt is subjected to a vacuum degassing immediately before the shaping apparatus and the melt is sent directly to the shaping apparatus within a maximum of 30 minutes after its discharge from the reactor at a maximum temperature of 35° C. above the crystallite melting point of the polyester.

13 Claims, No Drawings

PROCESS FOR DIRECT PRODUCTION OF LOW ACETALDEHYDE PACKAGING MATERIAL

DESCRIPTION

This invention concerns a continuous process for direct production, only in the melt phase, of thermoplastic polyesters suitable for packaging and storing foods without any effect on taste due to the low acetaldehyde content.

Polyesters for packaging foods must have a relatively high viscosity plus the lowest possible concentration of acetaldehyde, because the latter substance imparts an unpleasant taste and odor to the packaged foods.

PRIOR ART

Melt-phase polycondensation of low-molecular dicarboxylic acid diol esters in conventional stirred autoclaves (for example, U.S. Pat. No. 4,020,049) yields polyesters with an intrinsic viscosity of about 0.55 to 0.65 dl/g and in special reactors, such as ring disc reactors (U.S. Pat. No. 3,499,873), polyesters with an intrinsic viscosity of up to about 1.0 dl/g are obtained. Introducing an inert gas stream in finely divided form into the molten reaction compound during polycondensation should increase the reaction rate and thus also the viscosity and thermal stability of the polyester. No reduction in the acetaldehyde content was observed, presumably because of the long dwell time in the melt between the introduction of the gas and the processing of the polyester. Suitable gases mentioned in U.S. Pat. Nos. 3,480,587 and 3,486,864 include nitrogen, German (examined) patent 1,025,142 mentions nitrogen, hydrogen and carbon dioxide, Japanese (examined) patent 67-25,309 mentions hydrogen and carbon dioxide, German (unexamined) patent 1,720,423 mentions carbon dioxide and U.S. Pat. No. 2,742,451 mentions aliphatic, aromatic and hydroaromatic hydrocarbons, such as undecane, benzene and decahydronaphthalene.

By limiting the dwell time of the polyester melt between the outlet of the polycondensation reactor and the entrance into the processing equipment, namely a spinning apparatus in this case, to a maximum of 20 minutes, the resulting drop in viscosity of the polyester melt can be minimized, for example, to 0.05 dl/g at an initial intrinsic viscosity of 0.96 dl/g (U.S. Pat. No. 4,072,663). The drop in viscosity that would occur when the polyester melt is stored temporarily for several hours due to the process can be minimized by stirring the melt under an atmosphere of nitrogen or carbon dioxide at an absolute pressure of 15 to 40 mm Hg (U.S. Pat. No. 2,865,892). However, our experience indicates that acetaldehyde is formed again in amounts of up to 150 ppm (depending on the temperature and dwell time) even when the decline in viscosity is minimized.

According to the known processes mentioned above, polyesters with a sufficiently high viscosity can be produced exclusively in the melt phase, but the acetaldehyde levels present in the polyester are too high to permit direct processing to produce food packaging. According to our experience, the free acetaldehyde concentration in the polyester melt at the entrance into the shaping apparatus is more than 30 ppm when using these methods either individually or in combination. Methods of limiting the thermal degradation of the molten polyester have been disclosed, but there have not been any methods of subsequently reducing the degradation products that have already formed, such as acetaldehyde, in the melt phase.

In the state of the art, polyester food packaging that has no effect on taste is produced by pelletizing while cooling the polyester melt that is obtained by melt-phase polycondensation and then subjecting the chips to a thermal solid-state treatment in an inert gas such as nitrogen or helium or in vacuo and finally melting it again in order to process it to packaging materials. This solid-state treatment leads to an increase in the molecular weight of the polyester and to a reduction in the acetaldehyde concentration in the polyester chips to less than 3 ppm (for example, U.S. Pat. Nos. 4,230,819, 4,238,593 and 4,263,425), where according to our findings the acetaldehyde concentration can increase again to about 10 ppm or even more in the subsequent remelting step. A smaller increase in acetaldehyde content during melting of the chips and the subsequent further processing of the molten polyester immediately thereafter is achieved by preventing the polyester from coming in contact with gaseous oxygen (U.S. Pat. No. 4,142,040) by introducing an inert gas such as nitrogen into the intake zone of the melting extruder. However, any remaining traces of oxygen are sufficient to induce a great deal of thermal degradation of the polyester. This process with a solid-state treatment downstream from the melt polycondensation is also unfavorable from the standpoint of both energy and economy. The polyester melt must first be cooled by pelletization after it is produced and then it must be heated again during the solid-state treatment and finally it must be melted again. The additional equipment expense consisting of a crystallizer and a solid-state reactor is quite high. In addition, amorphous polyesters are not suitable for such a solid-state treatment because of their tendency to stick.

In the process according to U.S. Pat. No. 5,080,845, impurities such as monomers and solvents can be removed from polymers by melting the polymer in a first extruder and then mixing the melt with a supercritical extraction gas such as carbon dioxide and then performing vacuum degassing in a second extruder. It is not apparent whether the dealdehydization of polyesters achieved by this method is sufficient for use in packaging foods. Polyethylene terephthalate with a residual acetaldehyde content of 1 ppm is obtained by introducing carbon dioxide and by means of a thermal vacuum treatment of the polymer melt in a special twin-screw kneader with seven alternating pressure zones according to the process disclosed in German patent 4,328,013. Nitrogen and solvent should also be suitable as a separation medium. A disadvantage of this process is that it requires an extruder that has a complex design which is thus very expensive.

It is also known that the acetaldehyde content of polyesters can be reduced by adding compounds that contain amide groups, especially polyamides (U.S. Pat. Nos. 4,837,115, 5,258,235 and 5,266,413). This process starts either with a polyester that already has a greatly reduced acetaldehyde content in comparison with the level measured at the outlet of the melt polycondensation reactor or else a large amount of at least 2 wt % amide compound must be added to the polyester, which leads to negative effects on the other properties of the polyester, especially the optical properties.

SUMMARY OF THE DISCLOSURE

Therefore, the object of the present invention is to develop a process that permits dealdehydization of the polyester melt sufficient for direct further processing to produce food packaging materials before entrance into the molding apparatus without any intermediate conversion of the polyester to the solid form (chips) following melt-phase polycondensation. The process must have no negative effects on the other polyester properties due to the presence of additives that bind acetaldehyde. In addition, the process should also be suitable for producing amorphous polyesters with a low acetaldehyde content and the equipment required should be minimized.

These objects are achieved according to this invention by a process having the following essential characteristics:

- production of the polyester by esterification or ester exchange and subsequent melt polycondensation takes place in the presence of the conventional catalysts plus an added 5 to 120 ppm of a catalyst consisting of cobalt, or cobalt plus manganese in a molar ratio of 1:1 to 3:1, and the same molar amount of phosphorus or up to twice the molar amount of phosphorus, each in the form of their polyester-soluble compounds;
- immediately after discharge from the melt-phase polycondensation reactor, an inert gas is introduced into the polyester melt and distributed uniformly there;
- 0.05 to 1.0 wt % of an acetaldehyde-reducing amide compound that has a low volatility is added to the polyester melt at the same time or immediately next to the gas inlet;
- the polyester melt is subjected to a vacuum degassing immediately before entering the shaping apparatus;
- the temperature of the melt and its dwell time are selected so that the polyester melt undergoes a change in its intrinsic viscosity of a maximum of ±5%, based on the viscosity at the outlet of the reactor, between the outlet of the reactor and the entrance to the shaping apparatus;
- the amount of gas introduced is at most equal in weight to the amount of polyester and in combination with the other measures, it is at least adequate to reduce the free acetaldehyde content of the polyester melt from any high level to a level of less than 5 ppm at the entrance to the shaping apparatus.

DETAILED DISCLOSURE

The introduction of an inert gas into the polyester melt immediately after the outlet from the last melt-phase polycondensation reactor and the subsequent vacuum degassing according to this invention lead not only to a limit on the additional thermal degradation of this polyester melt, but also leads to a reduction in the amount of degradation products such as acetaldehyde already present in the melt. This acetaldehyde-reducing effect can be further increased by adding small amounts of known acetaldehyde-reducing amide compounds that have a low volatility directly next to the gas inlet. It has surprisingly been found that dealdehydization of polyesters produced in the presence of cobalt compounds or cobalt plus manganese compounds and phosphorus compounds in the stated amounts takes place much more rapidly and more thoroughly than with polyesters produced without these additives. It has also been found that expensive equipment such as that according to German patent 4,328,013 is unnecessary. In the process according to this invention, a few static mixing elements in the melt line immediately after the melt-phase polycondensation reactor and an enlargement in the melt line connected to the vacuum pump directly upstream from the shaping apparatus are sufficient to achieve a sufficient reduction in the acetaldehyde content of the polyester. The process according to this invention results in shaped polyester packaging that is neutral with regard to taste by treatment of the polymer directly in the melt phase without the detour of a thermal solid-state treatment that is necessary with the known processes. Further, there are no negative effects on the other polyester properties due to larger amounts of additives, and the process is carried out in the simplest possible manner in terms of equipment required.

The process according to this invention is suitable for all conventional thermoplastic polyesters that are used for producing food packaging, where the dicarboxylic acid component of the polyester consists primarily of terephthalic acid and/or isophthalic acid and/or 2,6-naphthalenedicarboxylic acid, and its diol component may contain other diols such as 1,4-cyclohexanedimethanol and/or diethylene glycol in addition to at least about 70 wt % ethylene glycol. The preferred application area is for ethylene terephthalate polymers and their copolymers modified with up to about 10 wt % of the aforementioned comonomers. The intrinsic viscosity of these polyesters is preferably at least 0.50 dl/g, especially in the range of 0.55 to 0.85 dl/g at the outlet from the polycondensation reactor. The intrinsic viscosity values in this specification and in the appended claims are measured at 25° C. on a solution of 0.5 g polyester in 100 ml of a mixture of 3 parts by weight phenol and 2 parts by weight 1,2-dichlorobenzene.

Such polyesters are produced by esterifying the dicarboxylic acid or by ester exchange between the dialkyl dicarboxylate and the diol and then precondensation and melt-phase polycondensation in vacuo in the presence of a conventional catalyst such as compounds of antimony, germanium, zinc, tin, titanium, magnesium and/or lithium. According to this invention, supplemental catalyst is added to the reaction mixture consisting of cobalt and phosphorus, phosphorus being present in a molar amount equal to or up to twice the molar amount of cobalt, the total amount of added catalyst being 5 to 120 ppm. In place of cobalt alone, a mixture of cobalt and manganese in a molar ratio of 1:1 to 3:1 may be substituted. If the polyester is produced by direct esterification of the acid, rather than by ester interchange, the total quantity added should not exceed 60 ppm. The catalysts are added in the form of their polyester-soluble compounds. These catalysts may be added at any time before the end of the melt polycondensation process. The cobalt and manganese compounds are preferably added just before or at the start of the polycondensation, and the phosphorus compounds are added toward the end of polycondensation. Other known additives such as dyes, antistatics and lubricants may also be added to the polyester during production or processing. The last phase of polycondensation preferably takes place in a reactor whose design permits the development of a large free melt surface that is constantly renewed. Examples include the reactors described in U.S. Pat. Nos. 3,617,225 and 5,055,273. The polyester melt leaving this last polycondensation reactor has a free acetaldehyde content in the range of 30 to 300 ppm, usually 40 to 150 ppm, depending on the production conditions, and it is sent directly to the shaping apparatus without intermediate storage. The term shaping apparatus as used here is understood to refer to any mold or die suitable for processing the polyester to yield the desired packaging material—for example, a casting device with a flat sheet die for films or an injection molding device for bottle parisons or for other molded articles. The polyester melt is maintained in the melt phase at a temperature that is at most 35° C., preferably at most 25° C., above the crystallite melting point of the polyester measured by DSC (before the measurement, sample heated briefly to 300° C. and quenched immediately) for a maximum dwell time of 30 minutes, preferably 3 to 20 minutes from the outlet of the polycondensation reactor to the entrance of the shaping apparatus. The melt pressure is normally 20 to 200 bar, preferably 20 to 100 bar. Under these conditions, neither further polycondensation nor degradation of the polyester occurs to any mentionable extent, so the intrinsic viscosity of the polyester does not change by more than ±5%, based on the intrinsic viscosity measured at the outlet of the reactor.

The free acetaldehyde content that is physically dissolved in the polyester is determined by the following method: The sample of polyester homopolymer or copolymer that is to be analyzed is first cooled with liquid nitrogen and then ground. The screen fraction smaller than 0.4 mm is used for the analysis. 2.0 g of the polyester sample to be determined are placed in a 30 ml bottle with a septum that has been purged with nitrogen, the bottle is sealed and kept at 150° C. for 90 minutes. A 2 ml sample of the nitrogen-acetaldehyde gas mixture is taken from the gas space of the bottle through the septum and the acetaldehyde content is determined by gas chromatography.

According to this invention, an inert gas is introduced into the polyester melt and distributed uniformly therein immediately after the melt leaves the reactor. Especially suitable gases include nitrogen, helium, carbon dioxide, methane, ethane, butane or a mixture of at least two of these gases. Other gases may be used, assuming they are inert with respect to the polyester and the catalyst residues in the polyester under the given pressure and temperature conditions and assuming their solubility will permit complete desorption during the vacuum degassing and shaping without any permanent gas inclusions in the polyester. The pressure of the gas must be at least equal to the pressure of the polyester melt or preferably 5 to 20 bar higher. The temperature of the gas should be selected so the polyester will remain in the melt phase and the given maximum temperature is not exceeded. Preferably static mixing elements should be installed in the melt line immediately after the gas feed point in order to achieve a homogeneous distribution of the gas in the melt. Use of other suitable equipment such as extruders is possible but not necessary. Static mixing without kneading or stirring of the polymer melt is sufficient.

The maximum amount of gas introduced is equal by weight to the amount of polyester. It has surprisingly been found that the reduction in the free acetaldehyde content of the polyester melt achieved according to this invention is not proportional to the amount of gas used. Instead, when there is an increase in the amount of gas under otherwise constant conditions, the acetaldehyde concentration decreases at first slowly, then very rapidly and finally extremely slowly. The amount of gas that corresponds to the range of a very great reduction depends primarily on the chemical nature of the gas, the temperature, the pressure and the dwell time, whereas the initial acetaldehyde concentration has only a slight effect. Therefore, the amount of gas introduced should correspond at least to the transition from the range of a very great reduction in concentration to the range of an extremely slow reduction. In other words, the amount of gas introduced must at least be sufficient in combination with the other measures to induce a reduction in the free acetaldehyde content of the polyester melt from any higher value to a level of less than 5 ppm at the entrance to the shaping apparatus. This is normally achieved when the weight ratio of the polyester to the gas is in the range of 1:0.01 to 1:0.3, preferably in the range of 1:0.02 to 1:0.15.

In addition, 0.05 to 1.0 wt % of an acetaldehyde-binding amide compound with a low volatility is added to the polyester melt at the same time or directly next to the gas inlet and distributed homogeneously in the melt together With the gas. Suitable amide compounds are known in the state of the art, but aliphatic aromatic polyamides are preferred. Amorphous transparent polyamides are especially suitable, such as the commercially available polyamides MXD 6 from Mitsubishi or SELAR PA 3426 from DuPont or copolyamides of hexamethylenediamine, adipic acid and terephthalic acid and/or isophthalic acid. Long chain aliphatic amide compounds are also suitable, such as the amide of erucaic acid or the commercial products Hostalub FA 1 from Hoechst, Irgawax 280 from Ciba-Geigy or Synthewax from Comiell in Milan. The resulting acetaldehyde concentration in the polyester melt is less than 5 ppm, preferably less than 3 ppm, at the entrance to the shaping apparatus after prior vacuum degassing. Since this refers only to reducing the residual acetaldehyde content from less than about 10 ppm to less than 5 ppm, very small amounts of less than 1.0 wt %, preferably less than 0.5 wt % of the amide compound, are sufficient, so there are no negative effects on any of the other polyester properties.

The polyester melt containing gas and amide is subjected to a vacuum degassing with a dwell time of less than 5 minutes and with the lowest possible shearing immediately before entering the shaping apparatus. The degassing is preferably performed at a pressure of less than 20 mbar absolute and with a dwell time of less than 3 minutes, especially less than 1.5 min, where the dwell time from the outlet from the vacuum degassing unit to the entrance to the shaping apparatus is less than 1 minute. In the simplest case, the degassing apparatus consists of an enlargement in the melt line that is equipped with a spiral stirrer and is connected to a vacuum pump. However, known types of equipment such as extruders and kneaders with a degassing zone can also be used. The measures according to this invention yield a reduction in the free acetaldehyde content of the polyester melt to less than 5 ppm at the entrance to the shaping apparatus. This invention is explained in greater detail below on the basis of examples.

SPECIFIC EXAMPLES

Examples 1–11

The polyester melt entering the melt line that led from a melt polycondensation reactor to the shaping apparatus had 10 SMX mixing elements from Sulzer in Switzerland installed in the line, and the following properties:

In Examples 1–4, a polyethylene terephthalate produced by the ester exchange method was used having an intrinsic viscosity of 0.63 dl/g, a diethylene glycol content of 0.84 wt %, a cobalt content of 22 ppm, a manganese content of 41 ppm and a phosphorus content of 55 ppm, a carboxyl end group concentration of 40 meq/kg and a crystallite melting point (DSC) of 255° C.

An ethylene terephthalate copolyester produced by the esterification method and having an intrinsic viscosity of 0.79 dl/g, a diethylene glycol content of 1.4 wt %, an isophthalic acid content of 2.5 wt %, a cobalt content of 10 ppm and a phosphorus content of 20 ppm, a carboxyl end group concentration of 17 meq/kg and a crystallite melting point (DSC) of 248° C. was used in Examples 5–11.

In all the examples, nitrogen heated to 280° C. was introduced into the polyester melt at a pressure of 150 bar at the beginning of the melt line. The pressure of the polyester melt in the area of the nitrogen inlet was 135 bar and the temperature of the melt in the entire melt line was 280° C., except in Example 8, where the temperature was 290° C.

Example 9 was carried out like Example 5, but 0.3 wt % of the amorphous polyamide Selar PA 3426 from DuPont was added to the polyester melt at the same time with the nitrogen.

Example 10 was carried out like Example 6 and Example 11 was carried out like Example 9, where the polyester melt was subjected to a vacuum degassing at a pressure of 1 mbar absolute for 1 minute immediately before entering the shaping apparatus.

The dwell times in the melt line, the throughputs and the measured concentrations of free acetaldehyde in the polyester melt at the beginning of the melt line (zero value) and immediately before entering the shaping apparatus (final value) are summarized in the following table. In all examples, the intrinsic viscosity of the polyester melt was slightly lower (i.e., no more than 5% lower) at the entrance to the shaping apparatus than at the entrance to the melt line.

Examples 1–10 are comparative examples showing that a residual acetaldehyde concentration of less than 3 ppm is achieved only when all the measures according to this invention are carried out at the same time (Example 11).

| Example | Polyester throughout (kg/h) | Dwell Time (min) | Aldehyde zero value (ppm) | Nitrogen throughout (l/h) | Final Acetaldehyde value (ppm) |
|---|---|---|---|---|---|
| 1 | 1.5 | 10 | 130 | 70 | 13 |
| 2 | 0.75 | 20 | 280 | 40 | 28 |
| 3 | 0.75 | 20 | 280 | 60 | 20 |
| 4 | 0.75 | 20 | 280 | 80 | 15 |
| 5 | 1.5 | 10 | 40 | 55 | 4.5 |
| 6 | 0.75 | 20 | 110 | 50 | 20 |
| 7 | 0.75 | 20 | 110 | 60 | 11 |
| 8 | 1.5 | 10 | 82 | 90 | 14 |
| 9 | 1.5 | 10 | 40 | 55 | 3.5 |
| 10 | 0.75 | 20 | 110 | 50 | 6 |
| 11 | 1.5 | 10 | 40 | 55 | 2.3 |

We claim:

1. Process for the reduction of the free aldehyde content in a polyester melt during production of shaped polyester food packaging material which does not affect taste of the food, the steps of which are carried out as polyester in the melt phase flows directly from a poly-condensation reactor to a shaping apparatus, said polyester having at least 70 wt % ethylene glycol units based on the total diol units, said process comprising (a) providing a polyester melt which contains, in addition to conventional reaction catalysts, an added 5–120 ppm of a) cobalt or b) cobalt and manganese in a molar ratio of 1:1 to 3:1 and c) phosphorus in a molar amount equal to or twice the molar amount of cobalt, each in the form of their polyester-soluble compounds, (b) introducing an inert gas through a gas inlet and uniformly distributing said inert gas into said polyester melt immediately after leaving said polycondensation reactor in an amount, by weight, not in excess of the amount of polyester by weight to reduce the free aldehyde content of said polyester melt, (c) adding from 0.05 to 1.0 wt % of a low-volatility acetaldehyde-reducing amide, said amide being added to the polyester melt through an inlet next to said inert gas inlet, (d) vacuum degassing said polyester melt immediately before entering said shaping apparatus, (e) sending said degassed polyester melt to said shaping apparatus for processing into said shaped polyester food packaging, and (f) maintaining the temperature of said polyester melt at not more than 35° C. above the crystallite melting point for a maximum dwell time of 30 minutes between steps (b) to (e).

2. Process of claim 1 in which said polyester of step (a) has been produced by esterification and subsequent polycondensation and said added compounds are present in an amount of 5–60 ppm.

3. Process of claim 1 in which said polyester of step (a) has been produced by ester interchange and subsequent polycondensation.

4. Process of claim 1 in which the inert gasses added in step (b) are taken from the group consisting of nitrogen, helium, carbon dioxide, methane, ethane, butane and mixtures thereof.

5. Process of claim 1 in which said gas and said amide of steps (b) and (c) are uniformly distributed by static mixing.

6. Process of claim 1 in which step (d) is performed within a dwell time of less than 5 minutes.

7. Process of claim 6 in which step (d) is performed at a pressure of less than 20 mbar.

8. Process of claim 1 in which step (e) is performed with a dwell time of less than one minute.

9. Process of claim 1 in which said polyester melt in step (e) has a free acetaldehyde content of less than 5 ppm.

10. Process of claim 9 in which said free acetaldehyde content is less than 3 ppm.

11. Process of claim 1 in which the polyester melt in step (a) undergoes a change in intrinsic viscosity amounting to a maximum of ±5% between steps (b) to (e).

12. Process of claim 1 in which said polyester in step (a) is an ethylene dicarboxylate homopolyester or copolyester having an intrinsic viscosity of at least 0.50 dl/g, the dicarboxylic acid component of said polyester being taken from the group consisting of terephthalic acid, isophthalic acid, 2,6-naphthalene dicarboxylic acid and mixtures thereof, and the diol component, in addition to said ethylene glycol, being taken from the group consisting of 1,4-cyclohexane dimethanol and diethylene glycol.

13. The process of claim 7 in which during the vacuum degassing step the polyester melt is stirred creating a shearing force in the melt, said shearing force being as low as possible.

* * * * *